US008328237B2

(12) United States Patent
Woo et al.

(10) Patent No.: US 8,328,237 B2
(45) Date of Patent: Dec. 11, 2012

(54) STEERING COLUMN DYNAMIC DAMPER

(75) Inventors: Jaehak Woo, West Bloomfield, MI (US); Changil Lee, Canton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 248 days.

(21) Appl. No.: 12/244,050

(22) Filed: Oct. 2, 2008

(65) Prior Publication Data

US 2009/0091114 A1 Apr. 9, 2009

Related U.S. Application Data

(60) Provisional application No. 60/977,388, filed on Oct. 4, 2007.

(51) Int. Cl.
*B62D 1/18* (2006.01)
*B62D 1/11* (2006.01)
*B62D 1/19* (2006.01)

(52) U.S. Cl. .................. 280/779; 188/379; 267/140.13; 267/141; 74/492

(58) Field of Classification Search .................. 280/775, 280/779, 780; 267/140.13, 141; 188/379; 74/492, 574.4; 464/180
See application file for complete search history.

(56) References Cited

U.S. PATENT DOCUMENTS 2,018,870 A * 10/1935 Paton .......................... 296/1.03
2,854,100 A * 9/1958 Oiley et al. .................. 188/316
3,053,526 A * 9/1962 Kendall ........................ 267/134
3,388,772 A * 6/1968 Marsh et al. ................. 188/379
3,713,641 A * 1/1973 Kendall ........................ 267/139
4,424,961 A * 1/1984 Takei ......................... 267/64.27
5,884,902 A * 3/1999 Hamada et al. ............... 267/141
5,887,843 A * 3/1999 Hidekawa et al. ............ 248/559
6,116,648 A * 9/2000 Holly et al. .................. 280/777
6,152,488 A * 11/2000 Hedderly et al. ............ 280/775
6,508,343 B2 * 1/2003 Misaji et al. ................. 188/379
6,547,043 B2 4/2003 Card
6,623,365 B1 * 9/2003 Maretzke et al. ............ 464/180
6,634,250 B2 10/2003 Schroter et al.
6,662,912 B2 12/2003 Smith, Jr. et al.
6,681,883 B2 1/2004 Loh et al.
6,733,039 B2 5/2004 Honda et al.
6,736,423 B2 5/2004 Simonian et al.
6,752,039 B2 6/2004 Kreuzer et al.
6,779,637 B2 8/2004 Aoi et al.
6,921,066 B2 * 7/2005 Hamada .................. 267/140.12
7,264,097 B2 * 9/2007 Yasumoto et al. ............ 188/379
2002/0144873 A1 * 10/2002 Kato et al. .................... 188/378

FOREIGN PATENT DOCUMENTS

JP 6-107186 * 4/1994
JP 8-175399 * 7/1996

* cited by examiner

*Primary Examiner* — Joseph Rocca
*Assistant Examiner* — George Spisich
(74) *Attorney, Agent, or Firm* — Ralph E Smith

(57) ABSTRACT

A damper for a steering column assembly includes a housing attached to and extending along an axis of the steering column assembly. A mass is attached to a distal end of the housing with a resilient member being disposed between the housing and the mass that permits movement of the mass along an axis that is substantially parallel to the axis of the steering column assembly relative to the housing to absorb vibrational forces exerted on the steering column assembly along the axis.

14 Claims, 4 Drawing Sheets

56 14 12 48 58 60 52 54 46 62 50 10

14
54
56
46
12
50
62
58
60
10
48
52

22
30
24
32
44
26
16
28
20
26
44
28
34
18
38
36
64
40
42
20

22
24
30
30
16
32
44
44
26
26
38
40
64
42
20
18

STEERING COLUMN DYNAMIC DAMPER

CROSS-REFERENCE TO RELATED APPLICATION

This application claims benefit of U.S. Provisional patent application No. 60/977,388 filed Oct. 4, 2007.

FIELD

The present invention relates to dampers and more particularly to a damper for a steering column assembly.

BACKGROUND

Conventional steering column assemblies typically include a damper disposed within a steering wheel of the steering column assembly. The damper is positioned within the steering wheel to absorb vibration experienced by the steering column when a vehicle in which the steering column assembly and steering wheel are installed is operating in an idle or low-speed condition. Under such conditions, the steering wheel vibrates substantially within a frequency of thirty to forty hertz and vibrates in a direction generally normal to a floor of the vehicle (i.e., in an up/down direction). Because the steering column assembly and steering wheel vibrate within a thirty to forty hertz band during idle and/or low-speed driving conditions, the damper installed within the steering wheel is designed to offset vibrational forces exerted on the steering wheel within a thirty to forty hertz band to prevent tactile vibration.

While conventional dampers disposed within a steering wheel adequately absorb up/down vibration of a steering wheel during idle and low-speed driving conditions when a vibration applied to the steering wheel is substantially within a thirty to forty hertz band, such conventional dampers fail to adequately absorb vibrational forces exerted on the steering column and steering wheel when the vehicle is driven at high speeds, as vibrational forces exerted on the steering wheel during high-speed driving conditions are typically exerted along a longitudinal axis of the steering column and are within a seventy to ninety hertz band.

SUMMARY

A damper for a steering column assembly includes a housing attached to and extending along an axis of the steering column assembly. A mass is attached to a distal end of the housing with a resilient member being disposed between the housing and the mass that permits movement of the mass along an axis that is substantially parallel to the axis of the steering column assembly relative to the housing to absorb vibrational forces exerted on the steering column assembly along the axis.

steering column assembly includes a steering column extending along an axis. A housing is attached to the steering column and extends along an axis substantially parallel to the axis of the steering column. The housing includes a proximate end attached to the steering column and a distal end having a mass attached thereto. A resilient member is disposed between the housing and the mass and cooperates to absorb vibrational forces exerted on the steering column along the axis of the steering column, whereby a combined tuning frequency of the mass and the resilient member is approximately between seventy and ninety hertz.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
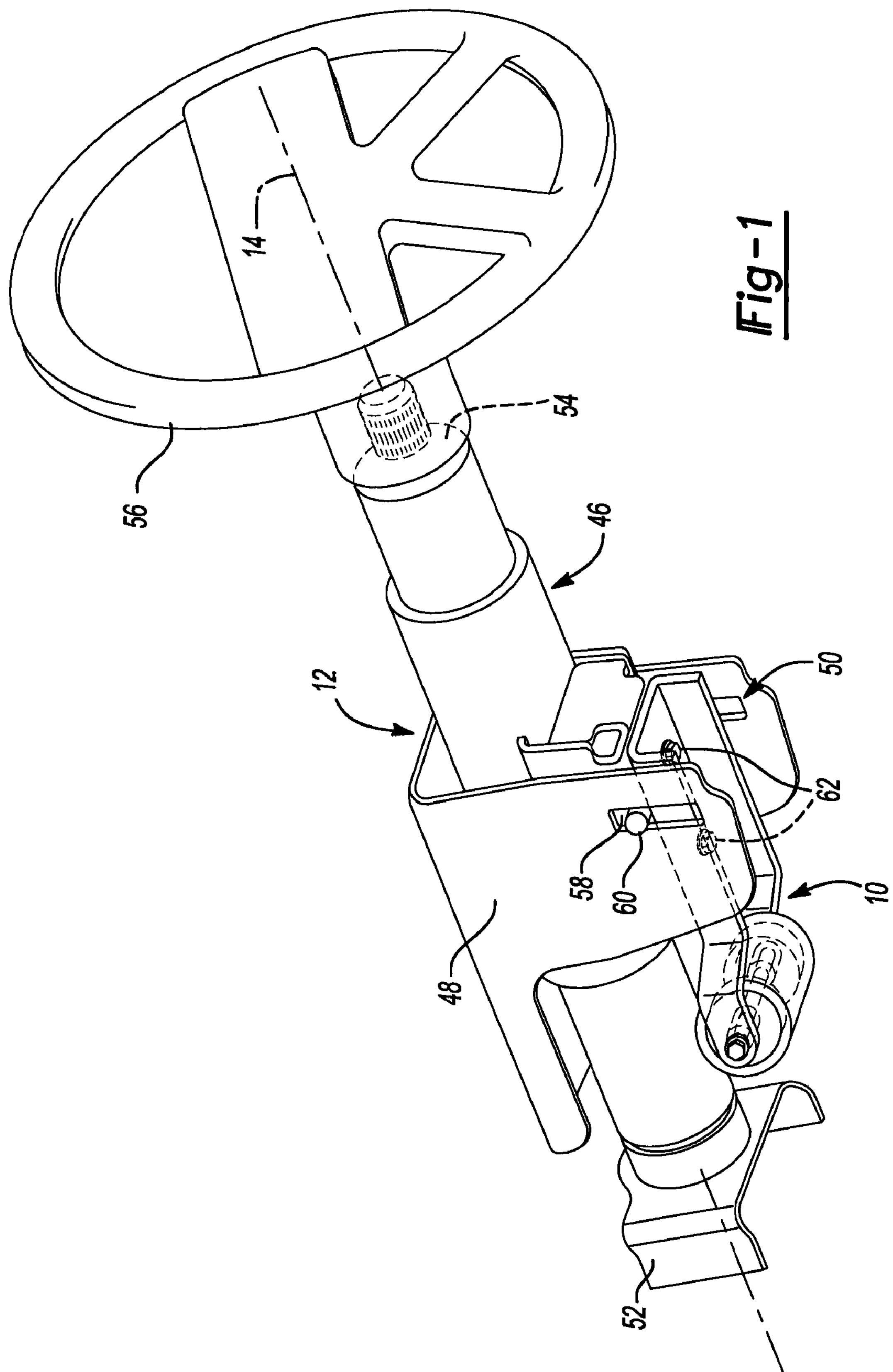
FIG. 1 is a perspective view of a steering column assembly incorporating a damper assembly in accordance with the principles of the present invention.
Figure 2:
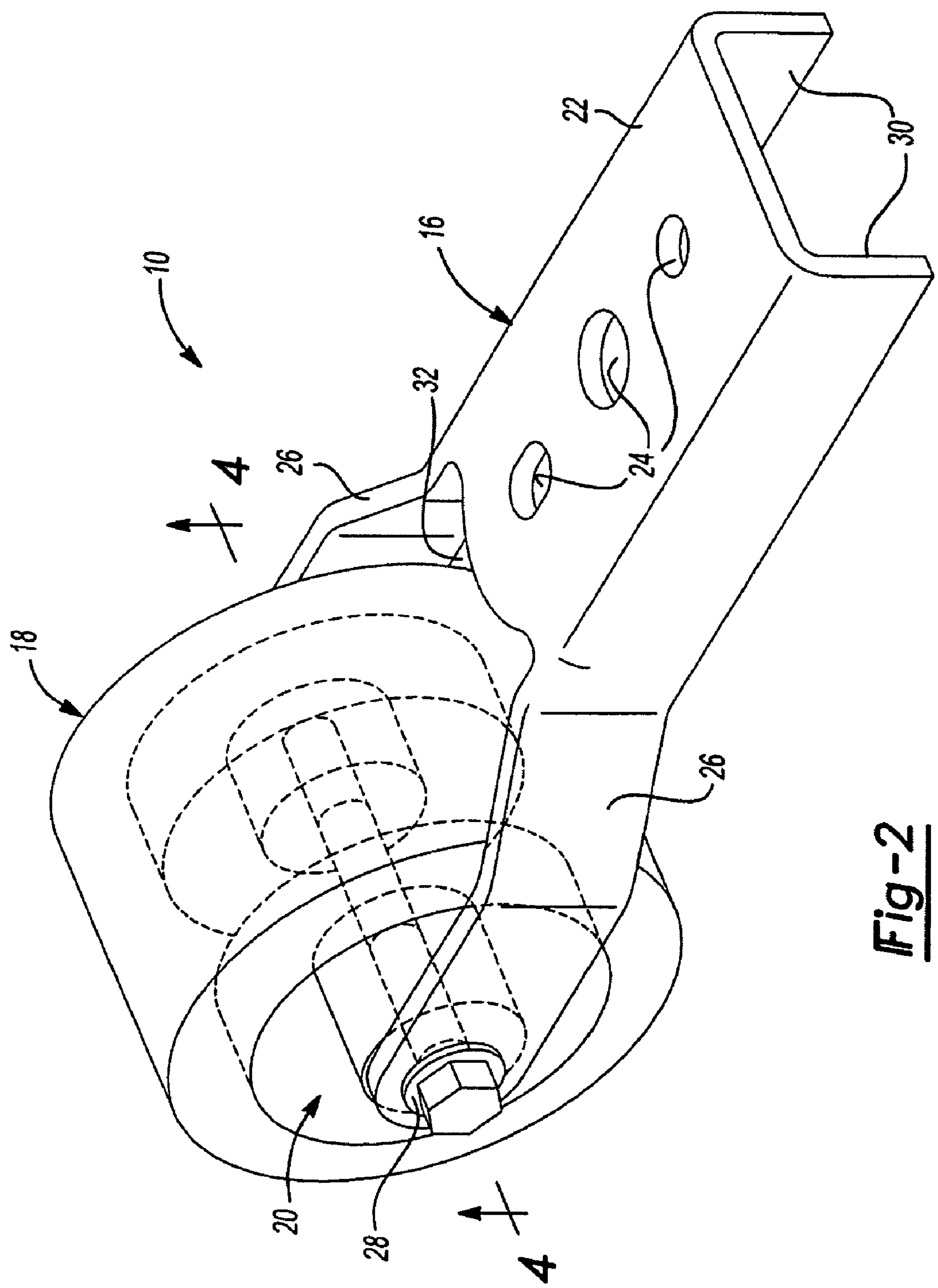
FIG. 2 is a perspective view of the damper assembly of FIG. 1.

The following description of the preferred embodiment(s) is merely exemplary in nature and is in no way intended to limit the invention, its application, or uses.

With reference to the figures, a damper assembly 10 for use with a steering column assembly 12 is provided. The damper assembly 10 extends along a longitudinal axis 14 of the steering column assembly 12 and absorbs vibrational forces exerted on the steering column assembly 12 along the longitudinal axis 14. The damper assembly 10 includes a tuning frequency substantially between seventy and ninety hertz to absorb vibrational forces applied to the steering column assembly 12 by a drive line of a vehicle (neither shown) when the vehicle is operated at high speeds.

The damper assembly 10 includes a housing 16, a mass 18, and a resilient member 20 that cooperates with the mass 18 to absorb vibrational forces applied along the longitudinal axis 14 of the steering column assembly 12. The housing 16 includes a main body 22 having a plurality of attachment apertures 24 formed therethrough. A pair of arms 26 extend from the main body 22 and each include an attachment aperture 28. The arms 26 respectively extend from a pair of sidewalls 30 of the main body 22 and generally define an opening 32 in which the mass 18 and resilient member 20 are received.

Figure 4:
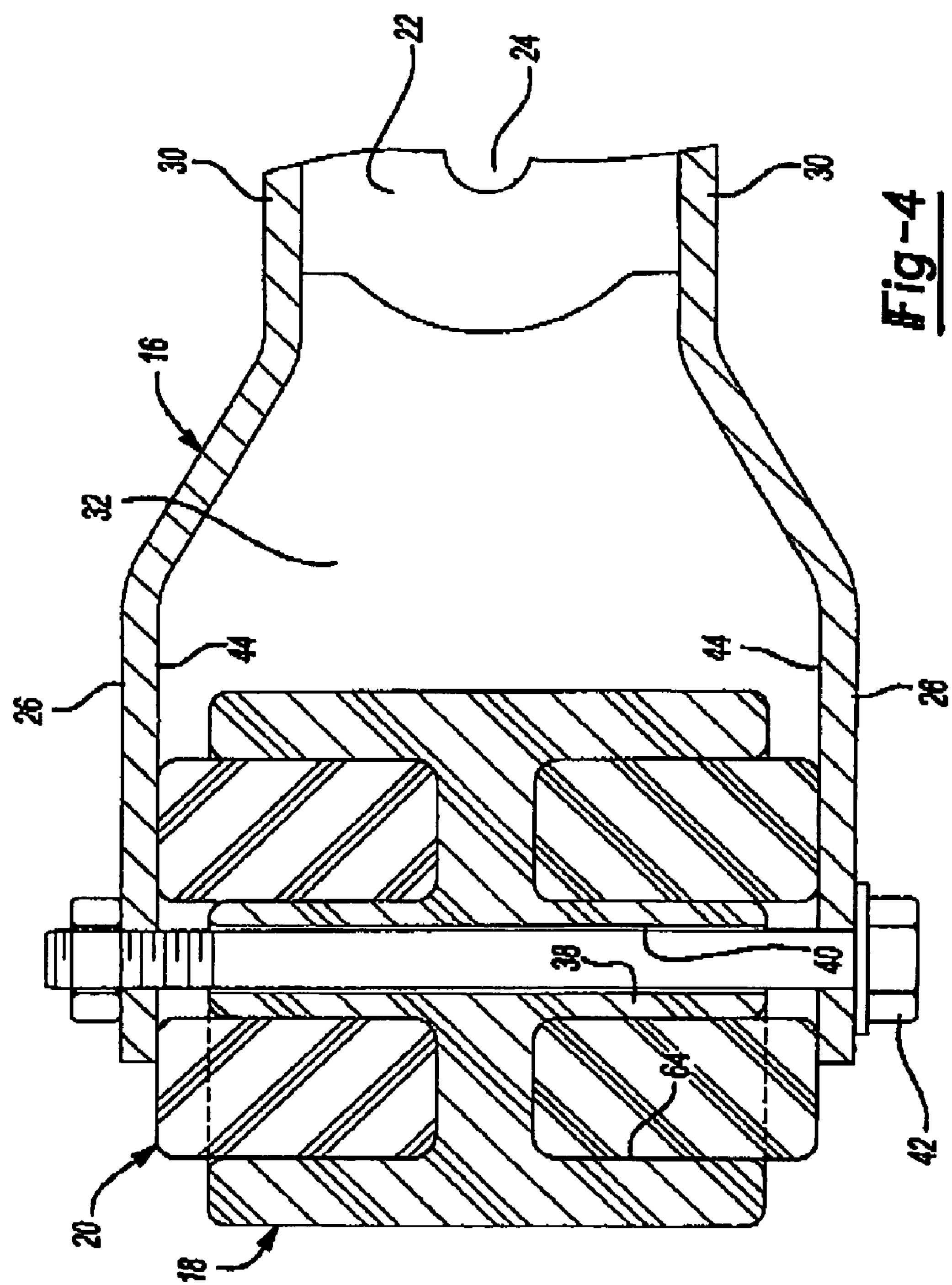
FIG. 4 is a cross-sectional view of the damper assembly of FIG. 1 taken along line 4-4 of FIG. 2.

The mass 18 may be formed from a solid material such as, for example, steel, and may include a generally circular shape. The mass 18 may include an outer surface 34, a recess 36, and a post 38 extending from the recess 36. The mass 18 is received at least partially between the arms 26 within the opening 32 and is attached to the arms 26 by a fastener 42 extending through a bore 40 of the post 38. As shown in FIG. 4, the mass 18, while being attached to the arms 26 of the housing 16 via the fastener 42, is spaced apart from the arms 26 by the resilient member 20 to allow the mass to vibrate relative to the housing 16.

The resilient member 20 may be any flexible material such as, for example, rubber, and is generally disposed between and in contact with the housing 16 and mass 18. Specifically, the resilient member 20 may be at least partially received within each recess 36 of the mass 18 such that the resilient member 20 is in contact with both the mass 18 and an inner surface 44 of each arm 26 of the housing 16. Once the resilient member 20 is disposed generally within the recesses 36 of the mass 18, the fastener 42 may be rotated relative to the housing 16 to compress the resilient member 20 between the housing 16 and the mass 18 to space the mass 18 from the housing 16.

As described above, the damper assembly 10 is attached to the steering column assembly 12 along the longitudinal axis 14 of the steering column assembly 12. In one configuration, the steering column assembly 12 includes a steering column 46, a mounting bracket 48, and an adjustment mechanism 50 that cooperates with the mounting bracket 48 to permit the steering column 46 to be positioned in a plurality of angular positions. The steering column 46 may include an attachment bracket 52 disposed at a first end thereof for attachment to an intermediate shaft (not shown), which connects the steering column 46 to a drive line of the vehicle via a rack and pinion assembly (neither shown). The steering column 46 may further include a splined hub 54 at a second end thereof that permits attachment of a steering wheel 56 to the steering column 46. Interaction between the splined hub 54 and the steering wheel 56 permits a rotational force applied to the steering wheel 56 to be similarly applied to and rotate the steering column 46 relative to the mounting bracket 48. The rotational force applied to the steering column 46 via the steering wheel 56 is transmitted to the vehicle drive line via interaction between the attachment bracket 52, intermediate shaft, and rack and pinion assembly.

The mounting bracket 48 may be fixedly attached to a vehicle structure (not shown) to mount the steering column 46 relative to the vehicle structure. In one configuration, the vehicle structure may be a cross-car beam or an instrument panel (neither shown). The mounting bracket 48 may include a slot 58 that slidably receives a pin 60 of the adjustment mechanism 50 to permit movement of the adjustment mechanism 50 and steering column 46 relative to the mounting bracket 48. Such movement of the steering column 46 and adjustment mechanism 50 relative to the mounting bracket 48 permits movement of the steering column 46 and, thus, the steering wheel 56, into a plurality of angular positions.

The damper assembly 10 may be attached to the adjustment mechanism 50 generally at the main body 22 of the housing 16. For example, a pair of fasteners 62 may be received within the attachment apertures 24 of the main body 22 to attach the housing 16 to the adjustment mechanism 50.

Attachment of the housing 16 to the adjustment mechanism 50 causes the housing 16 of the damper assembly 10 to extend in a direction parallel to the longitudinal axis 14 of the steering column assembly 12. As such, the housing 16, mass 18, and resilient member 20, while extending in a direction parallel to the longitudinal axis 14, are spaced apart from the longitudinal axis 14 of the steering column 46.

As shown in FIG. 1, the fasteners 62 are received through the attachment apertures 24 of the main body 22. As such, only a proximate end of the housing 16 is attached to the steering column assembly 12 while a distal end of the housing 16 that supports the mass 18 and resilient member 20 is cantilevered from the main body 22 of the housing 16. The above relationship permits the mass 18 and resilient member 20 to cooperate and absorb vibrational forces exerted along the longitudinal axis 14 of the steering column assembly 12 before the vibrational forces are transmitted along the longitudinal axis 14 and are experienced by the steering wheel 56.

The combined tuning frequency of the mass 18 and resilient member 20 is substantially within a range of seventy to ninety hertz. As such, when a vibrational force is applied to the steering column 46 along the longitudinal axis 14 that is substantially within the range of seventy to ninety hertz, the vibrational force is absorbed by interaction between the mass 18 and resilient member 20 prior to reaching the steering wheel 56, as will be described below.

With particular reference to FIG. 1, operation of the damper assembly 10 and steering column assembly 12 will be described in detail. During operation of the steering column assembly 12, the mass 18 and resilient member 20 of the damper assembly 10 cooperate to absorb vibrational forces applied to the steering column assembly 12 along the longitudinal axis 14. Specifically, the mass 18 and the resilient member 20 cooperate to absorb vibrational forces exerted on the steering column assembly 12 that are approximately within a range of seventy to ninety hertz.

Such vibrational forces (i.e., those producing a frequency substantially between seventy and ninety hertz) are generally experienced by the steering column assembly 12 when a vehicle in which the steering column assembly 12 is installed is operated at high speeds. Under such high-speed driving conditions, vibrational forces are exerted on the steering column 46 generally at the interface between the mounting bracket 48 and intermediate shaft. For example, when the vehicle is driven in a high-speed condition, vibration from the drive line of the vehicle is transmitted through the rack and pinion assembly and intermediate shaft to the attachment bracket 52 of the steering column assembly 12. The vibrational forces exerted on the attachment bracket 52 are transmitted along the steering column 46 and are absorbed by the damper assembly 10 prior to reaching the steering wheel 56.

The applied vibrational forces received at the attachment bracket 52 are transmitted along the steering column 46 and are received by the damper assembly 10 via the adjustment mechanism 50. The vibrational forces are transmitted to the damper assembly 10 due to the interaction between the housing 16 of the damper assembly 10 and the adjustment mechanism 50 and cause movement of the mass 18 relative to the housing 16. Such movement of the mass 18 relative to the housing 16 is generally in a direction parallel to the longitudinal axis 14 of the steering column assembly 12 and causes the mass 18 to compress at least a portion of the resilient member 20, as the mass 18 moves relative to the housing 16.

Figure 3:
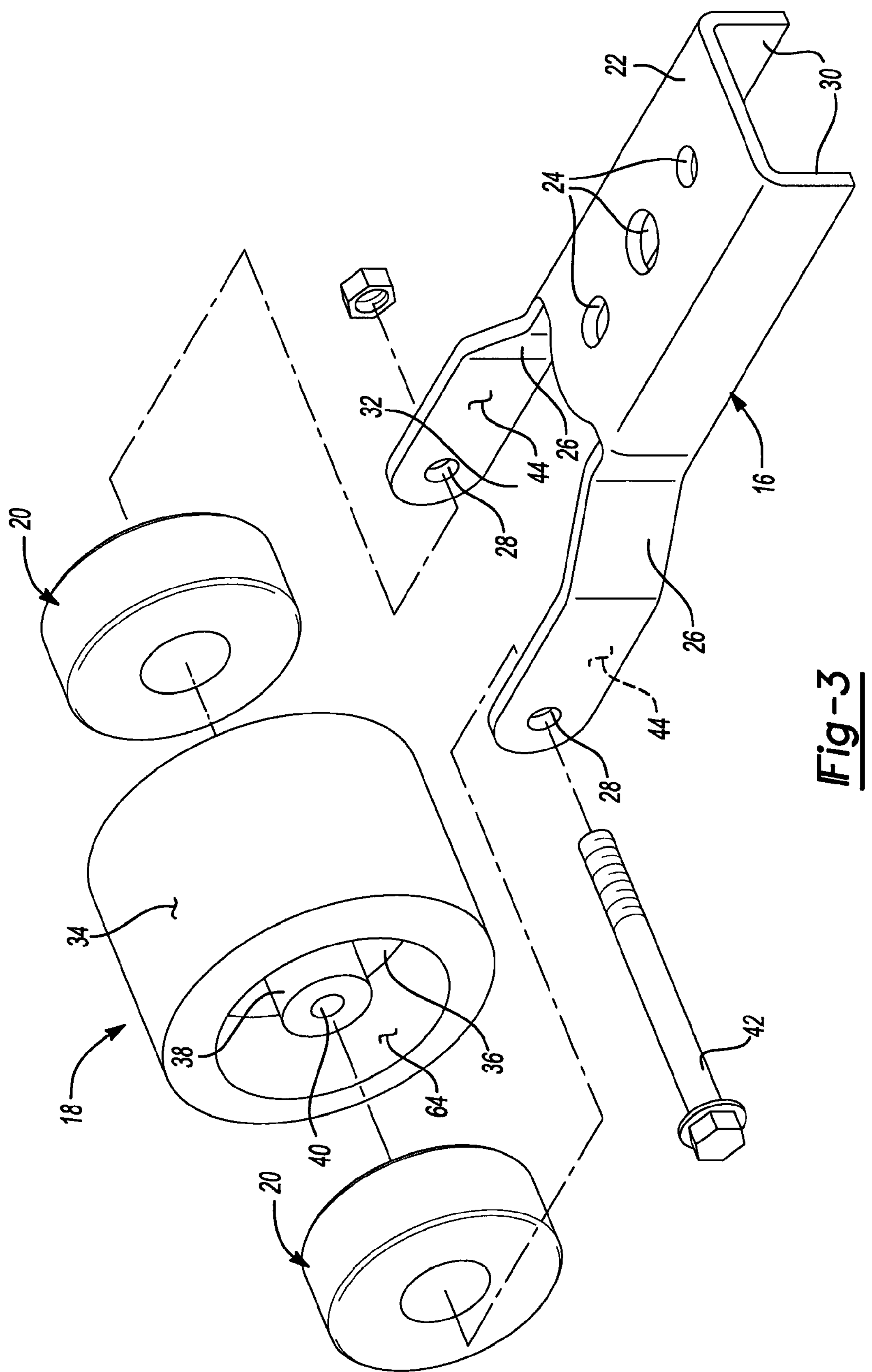
FIG. 3 is an exploded view of the damper assembly of FIG. 1.

When the force applied to the steering column 46 is transmitted to the damper assembly 10, the force causes the mass 18 to move relative to the housing 16 and compress the resilient member 20 at an inner surface 64 (FIG. 3) of the mass 18 when the mass 18 moves in a first direction and at the post 38 when the mass 18 moves in a second direction opposite the first direction. During application of the vibrational force, the resilient member 20 alternates between compression at inner surface 64 and at post 38 to absorb the vibrational force prior to the force reaching the steering wheel 56.

By preventing the vibrational force from reaching the steering wheel 56, the damper assembly 10 prevents and undesirable tactile vibration experienced by a user of the vehicle during high-speed driving conditions. In essence, the damper assembly 10 absorbs the vibrational force by being positioned along a path of the vibration between the vehicle drive line and the steering wheel 56 and prevents such vibrational forces from reaching the steering wheel 56 and causing an undesirable condition.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper assembly for a steering column assembly, the damper assembly comprising:

a housing attached to and extending along an axis of the steering column assembly and including a first arm and a second arm;

a mass attached to said housing proximate to a distal end thereof and between said first arm and said second arm;

a first resilient member disposed between said first arm and said mass;

a second resilient member disposed between said second arm and said mass; and a fastener extending through said first resilient member, said mass, and said second resilient member to attach said first resilient member, said mass, and said second resilient member to said housing at said first arm and said second arm to permit vibration of said mass relative to said housing.

2. The damper assembly of claim 1, wherein said mass is spaced apart from said first arm and said second arm by said first resilient member and said second resilient member, respectively.

3. The damper assembly of claim 1, wherein said first resilient member is compressed between said first arm and said mass and said second resilient member is compressed between said second arm and said mass.

4. The damper assembly of claim 1, wherein said mass, said first resilient member, and said second resilient member have a combined tuning frequency approximately between seventy (70) and ninety (90) hertz.

5. The damper assembly of claim 1, wherein said first resilient member and said second resilient member are formed from a substantially solid material.

6. The damper assembly of claim 1, wherein said first resilient member and said second resilient member are at least partially disposed within a recess of said mass.

7. The damper assembly of claim 1, wherein said fastener extends through a center of said mass, a center of said first resilient member, and a center of said second resilient member.

8. The damper assembly of claim 1, wherein said mass is concentric with said first resilient member and said second resilient member.

9. A damper assembly for a steering column assembly, the damper assembly comprising:

a housing attached to and extending along an axis of the steering column assembly;

a mass attached to said housing proximate to a distal end thereof;

a first resilient member formed from a substantially solid material and disposed between said housing and said mass, said mass being spaced apart from said housing by said first resilient member and operable to vibrate relative to said housing due to interaction of said first resilient member with said housing and said mass;

a second resilient member formed from a substantially solid material and disposed between said housing and said mass, said mass being spaced apart from said housing by said second resilient member and operable to vibrate relative to said housing due to interaction of said second resilient member with said housing and said mass; and a fastener extending through said first resilient member, said mass, and said second resilient member to attach said first resilient member, said mass, and said second resilient member to said housing.

10. The damper assembly of claim 9, wherein said first resilient member is compressed between said housing and said mass and said second resilient member is compressed between said housing and said mass.

11. The damper assembly of claim 9, wherein said mass, said first resilient member, and said second resilient member have a combined tuning frequency approximately between seventy (70) and ninety (90) hertz.

12. The damper assembly of claim 9, wherein said first resilient member and said second resilient member are at least partially disposed within a recess of said mass.

13. The damper assembly of claim 9, wherein said fastener extends through a center of said mass, a center of said first resilient member, and a center of said second resilient member.

14. The damper assembly of claim 9, wherein said mass is concentric with said first resilient member and said second resilient member.

* * * * *